(12) United States Patent
Kanerva et al.

(10) Patent No.: US 6,493,554 B1
(45) Date of Patent: *Dec. 10, 2002

(54) HANDOVER IN A MOBILE COMMUNICATION SYSTEM

(75) Inventors: Mikko Kanerva, Helsinki (FI); Jari Vainikka, Vantaa (FI); Juha Räsänen, Espoo (FI); Risto Aalto, Riihimäki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/367,494
(22) PCT Filed: Feb. 11, 1998
(86) PCT No.: PCT/FI98/00123
§ 371 (c)(1), (2), (4) Date: Oct. 22, 1999
(87) PCT Pub. No.: WO98/37719
PCT Pub. Date: Aug. 27, 1998

(30) Foreign Application Priority Data

Feb. 18, 1997 (FI) .................................................. 970683

(51) Int. Cl.$^7$ ................................................ H04Q 7/20
(52) U.S. Cl. ...................................... 455/437; 455/439
(58) Field of Search ................................. 455/436, 437, 455/438, 439, 443, 444, 525; 370/331, 332, 333; 714/746

(56) References Cited

U.S. PATENT DOCUMENTS

| 5,483,669 | A | | 1/1996 | Barnett et al. |
| 5,839,077 | A | * | 11/1998 | Kowaguchi |
| 6,219,550 | B1 | * | 4/2001 | Kanerva et al. |

FOREIGN PATENT DOCUMENTS

| EP | 454 638 | 10/1991 |
| WO | 92/12602 | 7/1992 |
| WO | 95/28808 | 10/1995 |
| WO | 96/26621 | 8/1996 |
| WO | 96/38997 | 12/1996 |

* cited by examiner

Primary Examiner—Nguyen T. Vo
(74) Attorney, Agent, or Firm—Pillsbury Winthrop LLP (57) ABSTRACT

The invention relates to a handover method in a mobile communication system in which error correction of a radio signal can be arranged with different protection levels. The method comprises measuring the signal level and/or quality of base stations in a mobile station, the signal quality and level of the mobile station at the base station is measured, comparing measurements results thus obtained and other variables of the connection with handover criteria, and handover is performed from the source cell to the target cell, when the handover criteria are met. The invention is characterized by determining at least one handover criterion depending on error correction of the radio connection. The invention further relates to a mobile communication system for performing handover.

14 Claims, 5 Drawing Sheets

HANDOVER IN A MOBILE COMMUNICATION SYSTEM

This application is the national phase of international application PCT/FI98/00123 filed Feb. 11, 1998 which designated the U.S.

FIELD OF THE INVENTION

The invention relates to a handover method in a mobile communication system in which error correction of a radio signal can be arranged with different protection levels. The method comprises measuring the signal level and/or quality of base stations in a mobile station, measuring the signal quality and/or level of the mobile station at the base station, comparing the measurement results thus obtained and other variables of the connection with handover criteria, and performing a handover from the source cell to the target cell when the handover criteria are met.

The invention also relates to a mobile communication system for performing handover.

BACKGROUND OF THE INVENTION

In cellular mobile communication systems, a radio coverage area is implemented with a plurality of slightly overlapping radio cells. When a mobile station moves from one cell to another, handover to a new radio cell is performed on the basis of predetermined handover criteria. The aim is to perform handover in a manner that disturbs an ongoing call as little as possible. Handover is normally performed on the basis of radio path criteria, but it may also be performed for other reasons, e.g. to divide the load, or to reduce transmission powers. Handover may also be performed inside a cell from one traffic channel to another.

Figure 1:
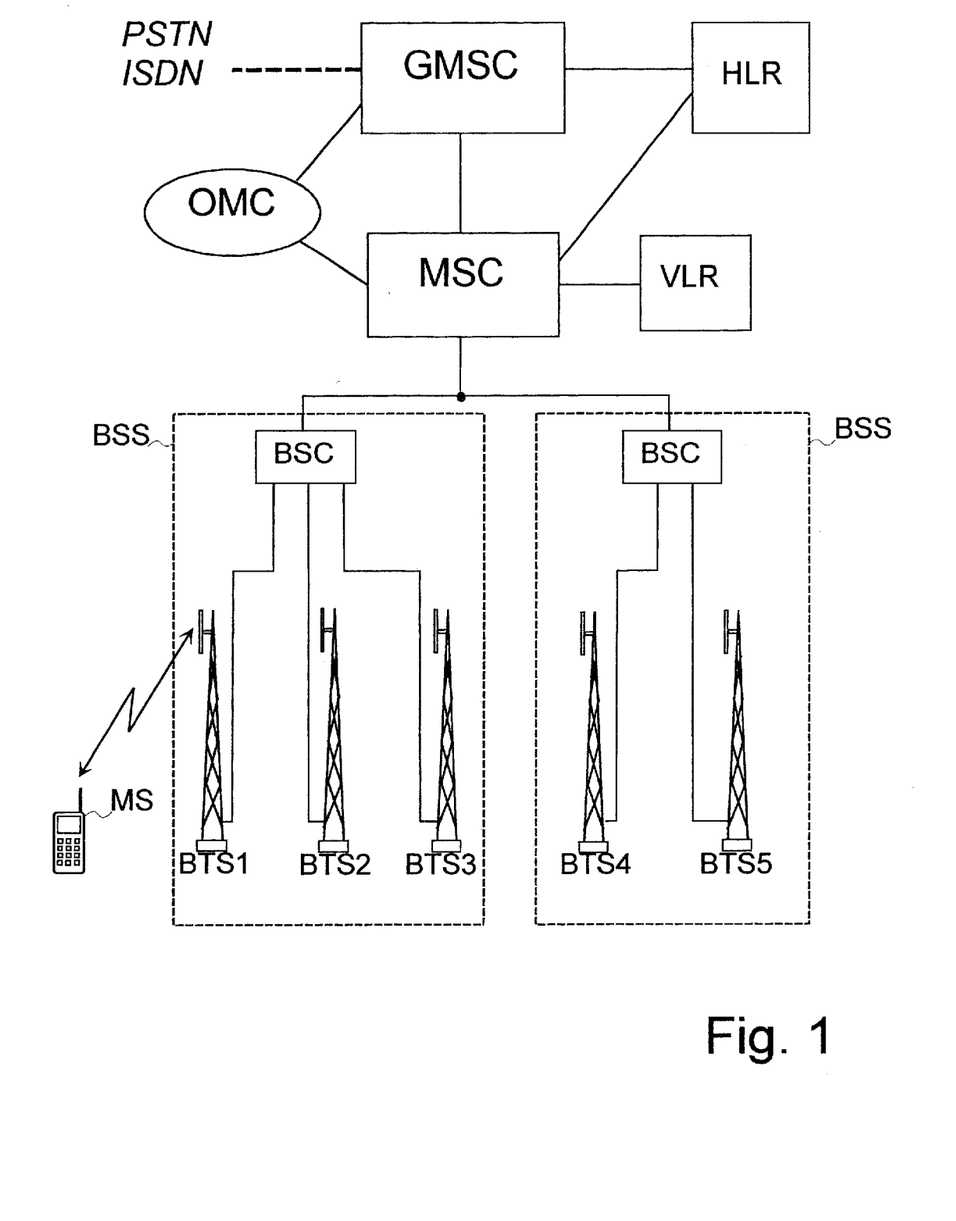
FIG. 1 is a block diagram of the structure of a mobile communication system.

FIG. 1 of the appended drawings shows a simplified block diagram of the pan-European GSM mobile communication system. A mobile station MS is connected over a radio path to a base transceiver station BTS, in the case of FIG. 1 to BTS1. A base station system BSS consists of a base station controller BSC and base stations BTS controlled by the BSC. A plurality of base station controllers BSC usually operate under the control of a mobile services switching centre MSC. An MSC communicates with other MSCs and, through a gateway mobile services switching centre GMSC, with a public switched telephone network. The operation of the entire system is controlled by an operation and maintenance centre OMC. The subscriber data of a mobile station MS are stored permanently in a home location register HLR of the system and temporarily in the visitor location register VLR in the area of which the MS is located at a given moment.

A mobile station MS and the serving base station BTS1 continuously measure the signal level and quality of the radio connection for example to determine the need for handover. The MS measures the signals of the serving base station BTS1 and the base stations BTS that are closest to its location area for instance to select a suitable target cell for handover. In the GSM mobile communication network, for example, an MS may simultaneously measure the signal level of both the serving base station and up to 32 other base stations. Via the serving base station BTS1, the MS is informed of the neighbouring cells it should measure. The measurement results of each cell are identified on the basis of the combination of a base station identity code BSIC and the frequency of the broadcast control channel BCCH. The base station BTS measures the signal level and quality of ongoing radio connections at the base station.

The mobile station MS sends the measuring results regularly as a report message through the serving base station BTS1 to the base station controller BSC. A report message contains the measurement results of the serving base station and up to six best neighbouring base stations. Handover from a serving cell to a neighbouring cell or to another channel of the serving cell may take place, for example, when the measurement results of the mobile station/base station indicate a low signal level and/or quality of the traffic channel of the current serving cell and a higher signal level is achieved in the neighbouring cell or a better signal quality can be achieved with another channel, or when a neighbouring cell/another channel allows communication at lower transmission powers. The signal level and/or load of the target cell, for example, affect the choice of the handover target cell. Generally used handover criteria include the signal level and quality of the radio connection, the signal levels of the source cell and the target cell, the signal quality of the source cell and the transmission power required of and allowed for a mobile station in the target cell. Handover from the source cell to the target cell is performed when the handover criteria set by an operator are met. In order for the stability of the mobile communication network to be ensured, the measurement results and parameters used in handover are averaged over a given period of time. The averaging process makes handover less sensitive to measurement results distorted by instantaneous interference or fading.

The base station controller BSC makes the decisions relating to handover. If the target cell is controlled by another BSC, the handover may be performed under the control of the MSC. Another possibility is that handover decisions are always made in a centralized manner in the MSC. If necessary, the BSC gives a handover command to the MS through the BTS.

In a mobile communication system implemented by code division multiple access (CDMA) technology, handover performed in the manner described above is called hard handover. In addition, CDMA systems can use so-called soft handover, in which a mobile station, during a handover, may be simultaneously connected to the network through several base stations. When one of these base stations proves to be better than the others on the basis of its signal, the connections of the mobile station with the other base stations are released, and the call is continued only through the best base station. Soft handover prevents recurring handovers between base stations when a mobile station is located on the periphery of cells.

Transmission errors which deteriorate the quality of a transmitted signal occur on the transmission path when speech or data is transmitted in a digital telecommunication system. Transmission errors occur on the transmission path when a signal is disturbed, for example, on account of multipath propagation, an interfering signal or high background noise level. Error correction of a digital signal to be transmitted, e.g. channel coding and/or retransmission, is used for improving the quality of the transmission and the tolerance of transmission errors. In channel coding, repetition is added to the original bit string of encoded speech or data by error correcting bits calculated from the original signal. In the receiver, the channel coding is decoded in a channel decoder, whereby the signal errors that have occurred during the transmission can be detected or even corrected by means of the correcting bits. Retransmission is used for correcting transmission errors either independently or, for example, in addition to channel coding: the errors in a channel coded transmission are corrected by retransmission of distorted frames. When the quality of the connection deteriorates, the number of erroneous and lost frames grows, and thus also the number of retransmissions grows.

Channel coding increases the number of bits to be transmitted. In the GSM mobile communication system, for example, error correcting bits with a transmission rate of 9.8 kbit/s are added to a full-rate 13 kbit/s speech signal, whereby the total transmission rate is 22.8 kbit/s. The level of the protection provided by channel coding is arranged according to the need. If a large number of data are to be transmitted fast, the amount of channel coding is reduced to allow more payload to be transmitted on the transmission channel. Channel coding may be arranged either to both detect errors occurred during the transmission and correct them or to merely detect them. In the GSM system, bits to be transmitted are divided according to their importance into different classes, in which channel coding is provided at a predetermined level. The different elements of the mobile communication system may limit the selection and, implementation of the channel coding provided for a connection. A mobile station may, for instance, support only certain channel codings. Furthermore, the protection level of the provided channel coding depends on the capability of the base station and other network elements to employ different channel codings.

A problem in the handovers of the prior art is that as network planning is generally made for channels using normal error correction, it is not always possible to determine an appropriate handover target cell with the handover procedure, when the quality of a connection performed with weak error correction indicates the need for handover. In addition, a problem in handovers based only on the level of base station signals is that the quality of a radio connection performed with weak error correction may deteriorate too much before handover is performed and the handover of a radio connection performed with efficient error correction is performed too soon.

BRIEF DESCRIPTION OF THE INVENTION

An object of the present invention is to provide an optimal way of performing handover in an environment where error corrections of several different levels are used.

This new type of handover is achieved with a method of the invention, which is characterized by determining for a connection at least one channel change criterion depending on the error correction of the radio connection.

Another object of the invention is a mobile communication system where error correction of a radio signal can be arranged with different protection levels, said system being arranged to measure the signal level and/or quality of base stations received in a mobile station, to measure the signal quality and level of the mobile station received at a base station, to compare the measurement results thus obtained and other variables of the connection with handover criteria, and to perform a handover from the source cell to the target cell, when the handover criteria are met. According to the invention, the mobile communication system is characterized by being arranged to determine at least one handover criterion depending on the error correction of the radio connection.

The invention is based on the idea that, when a handover decision is made, the effect of error correction on the signal level required on the radio connection is taken into account.

In the handover method of the invention, the error correction of the connection, preferably channel coding, is used as a criterion for handover. In a first embodiment of the invention the handover criterion according to the invention is set in such a way that it is met with a target cell base station signal that is better than normal when a weaker error correction has to be used on the target cell channel than on the source cell channel, and with a target cell base station signal that is weaker than normal when a more efficient error correction can be used on the target cell channel than on the source cell channel. A functionality can also be added to the first embodiment of the invention, on the basis of which functionality, when error correction is the same in the target cell and the source cell, the handover criterion of the invention is set in such a way that it is met with a target cell base station signal that is better than normal when the common error correction is more efficient than normal, and with a target cell base station signal that is weaker than normal when the common error correction is weaker than normal. Handover is performed to the target cell when the handover criterion of the invention and other possible handover criteria of the prior art are met, and simultaneously the protection level of error correction of the connection in the target cell is set to the level determined during handover. In a second embodiment of the invention a handover priority is determined for the connection on the basis of the error correction, preferably channel coding, employed on the radio connection in the source cell. A handover criterion triggers handover to different connections in the order of their priority values, when the other handover criteria of the connection are met.

An advantage of such handover is that handover can be flexibly arranged depending on error correction.

Another advantage of the handover of the invention is that unnecessary handovers are avoided, when the handover of the radio connection implemented with error correction that is more efficient than normal is performed, when it is necessary regarding the quality of the connection.

Yet another advantage of the handover of the invention is that a network planned for normal error correction can offer optimal handover even to mobile stations whose error correction is implemented at a protection level different from the normal.

A further advantage of the handover of the invention is that a change in the protection level of error correction during handover ensures that the quality of the radio connection to be handed over remains sufficiently good.

Still another advantage of the claimed handover is that it reduces the probability of a call being lost on a radio connection implemented with weaker error correction than normal.

BRIEF DESCRIPTION OF THE DRAWINGS

In the following, the invention will be described in greater detail with reference to the accompanying drawings, in which.

DETAILED DESCRIPTION OF THE INVENTION

The present invention can be applied in any cellular mobile communication system. In the following, the invention will be described in greater detail with reference, by way of example, to the pan-European digital mobile communication system GSM. FIG. 1 illustrates the above-described structure of a GSM network in a simplified manner. For a more accurate description of the GSM system, reference is made to the GSM recommendations and "The GSM System for Mobile Communications" by M. Mouly and M-B. Pautet, Palaiseau, France, 1992, ISBN: 2-9507190-0-7.

The present invention can be applied to different kinds of channel coding. An example of channel coding is the convolution coding which is used on a traffic channel of the GSM system and defined in GSM Recommendation 05.03. The efficiency of convolution coding can be indicated with the convolution code ratio X/Y, which means that X data bits are represented by Y code bits in channel coding. On a full-rate GSM traffic channel, the convolution code ratios are 1/2 (buffered), 1/3 and 1/6 for data rates of 9.6 kbit/s, 4.8 kbit/s and 0.3 to 2.4 kbit/s, respectively. A full-rate speech channel employs 1/2 channel coding. The most efficient channel coding is 1/6, the second most efficient is 1/3, and the weakest is 1/2.

As stated above, a problem with handovers of the prior art is that since network planning is generally made for traffic channels using normal error correction, an appropriate handover target cell cannot always be determined with the handover procedure, when the quality of the connection implemented with weaker error correction indicates the need for handover. A further problem with handovers based only on the level of base station signals is that the quality of the radio connection implemented with weaker error correction can deteoriorate too much before handover is performed and the handover of the radio connection implemented with efficient error correction is performed too early.

In the following, the invention will be described more generally without reference to any specific type of channel coding.

Figure 2:
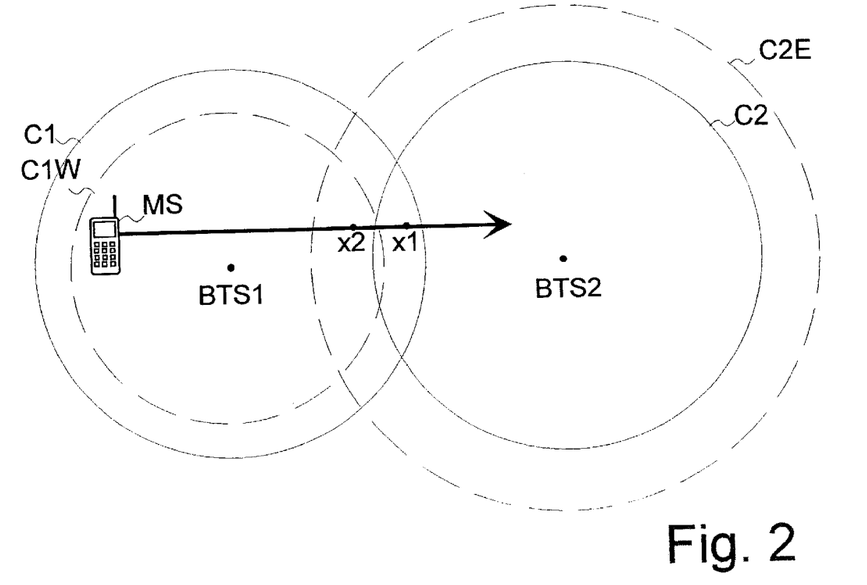
FIG. 2 shows an example of handover in a cellular network.

FIG. 2 shows an example of a handover when a mobile station MS moves from the area of base station BTS1 to the area of base station BTS2 in a cellular network. The area of the base station in which the MS is located before the handover will be hereafter called a source cell, and the area of the base station to which the handover is performed will be called a target cell. The target cell and the source cell can also be the same cell, when handover is performed inside a cell from one channel to another. FIG. 2 illustrates the coverage areas C1 and C2 of the base stations BTS1 and BTS2; within these coverage areas the quality of a radio connection using normal error correction, e.g. channel coding, usually remains sufficiently high to prevent calls from being lost. A radio connection using error correction weaker than normal requires a better signal than normal to achieve sufficient connection quality; correspondingly, error correction that is more efficient than normal renders it possible to achieve sufficient connection quality even with a signal that is weaker than normal. This effect of error correction (in this case the effect of channel coding) on the size of the coverage area of a base station is illustrated in FIG. 2 by broken lines, line C1W representing the effective coverage area of BTS1 with channel coding that is weaker than normal, and line C2E indicating the effective coverage area of BTS2 with channel coding that is more efficient than normal. Channel coding that is weaker than normal will hereafter be called weak channel coding, whereas channel coding that is more efficient than normal will be called powerful channel coding. In the case of GSM, normal channel coding refers herein to channel coding of a full-rate channel.

In FIG. 2, a handover of the prior art is shown to be performed at point x1 when the MS moves in the direction of the arrow from the area of BTS1 to the area of BTS2. One criterion used for triggering a handover is, for example, measurement results of a serving base station connection or base station measurement results reported by the MS to the network representing the signal level and/or quality of the base station BTS1 and the neighbouring base stations BTS2, . . . received by the MS. The handover of the prior art is started when the measurement results and other parameters of the connection meet the pre-set handover criteria. A common handover criterion is the relation of the signal level of a serving base station, BTS1 in the case of FIG. 2, to the signal level of a neighbouring base station, e.g. BTS2. When the relation of these signal levels trigger the pre-set handover criterion, for example, when the signal level of the neighbouring base station is 3 dB stronger than that of the serving base station, and the other handover criteria are also met, such as the transmission power required of the mobile station, a handover is performed from the serving base station BTS1 to the neighbouring base station BTS2 in question (in the case of FIG. 2 at point x1). In the case of a radio connection using weak channel coding, the effective coverage area of BTS1 thus corresponds to area C1W indicated by a broken line in FIG. 2, and therefore a handover performed at point x1 is performed too late and the call may already have been lost.

Figure 3:
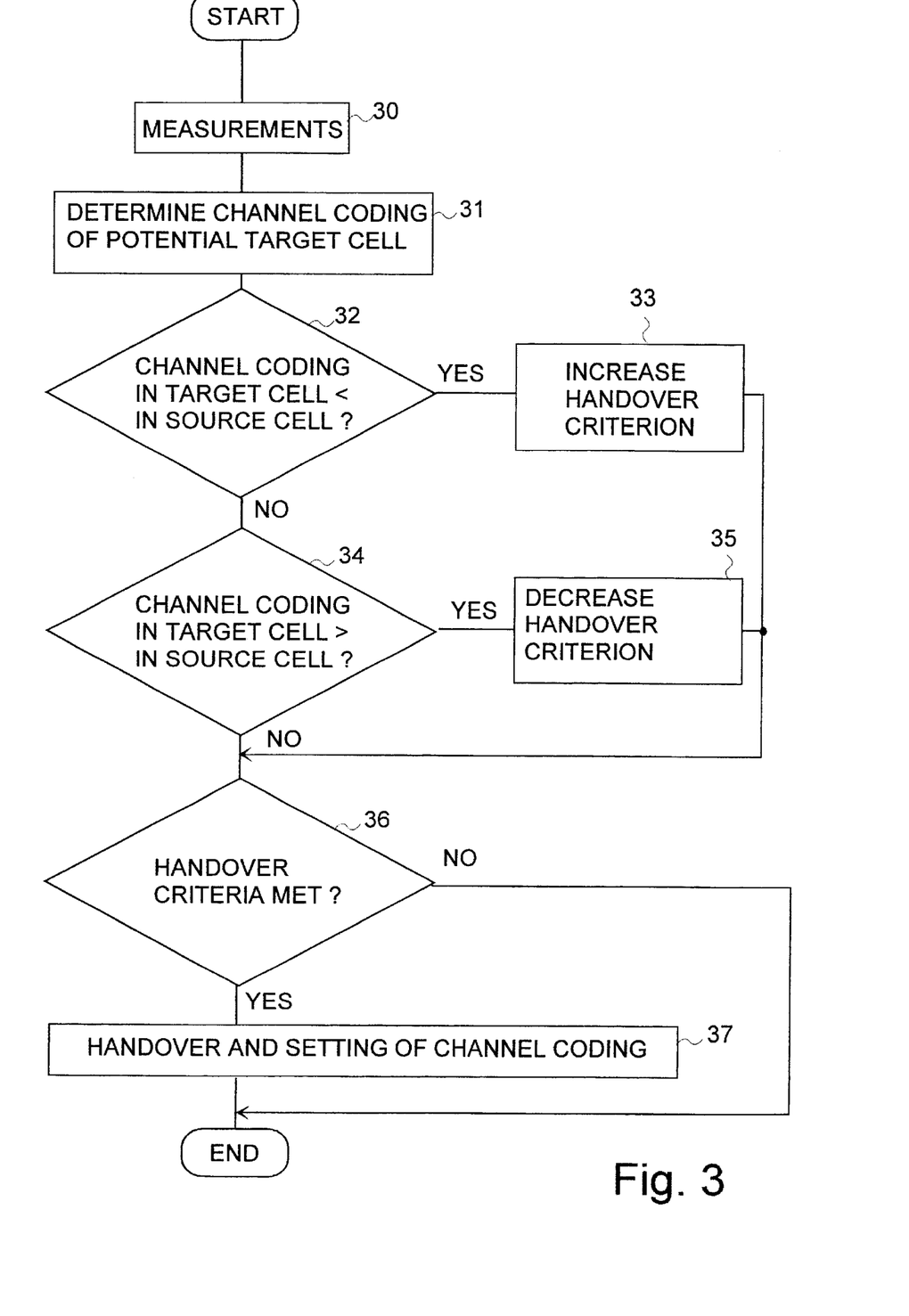
FIG. 3 is a flow chart of the first embodiment of the handover method of the invention.

In the following, the invention will be described in greater detail with reference to the first embodiment. In this embodiment, the error correction of a radio connection is implemented with channel coding. One handover criterion used in the first embodiment is the relation of the target cell signal level to the source cell signal level. FIG. 3 is a flow chart of the first embodiment of the handover method of the invention. For reasons of clarity, the handover procedure will be explained in the following with reference to only one channel coding alternative of one target cell. It will, however, be obvious to one skilled in the art that the following also applies if several potential target cells are monitored. In this case, the handover criterion of the invention is determined separately for the channel codings of each target cell; before a handover decision is made, each handover criterion is checked to find out whether it is possibly met.

In step of FIG. 3, a mobile station MS and a serving base station, BTS1 in the case of FIG. 2, measure the signal level and/or quality of a radio connection according to the prior art. In addition the mobile station MS measures signals from the neighbouring base stations. In step 31, the unit that makes the handover decision, preferably a base station controller BSC or a mobile services switching centre MSC, determines the channel coding offered to the radio connection by the possible target cell for handover (BTS2 in the case of FIG. 2), in accordance with the invention. The method of the invention is thus particularly well applicable even to networks where all base stations cannot use all the different channel coding alternatives. In step 32, the channel coding offered by BTS2 of the possible target cell and by BTS1 of the source cell are compared, according to the invention, with one another. If the channel coding of BTS2 of the possible target cell is weaker than that of BTS1 of the source cell, the value of the handover criterion is increased in step 33 from the normal; e.g. a signal level that is 6 dB stronger than the source cell signal is required of the target cell before this handover criterion is met. If the channel coding of BTS2 of the possible target cell is not weaker than that of BTS1 of the source cell, it is checked in step 34 whether the channel coding of BTS2 of the target cell is more powerful than the channel coding of BTS1 of the source cell. If the channel coding of BTS2 of the possible target cell is more powerful than that of BTS1 of the source cell, the value of the handover criterion is decreased in step from the normal; e.g. the handover criterion is set such that it is met when the signal level of the target cell is as high as the signal level of the source cell.

A handover is performed (step 37) from the base station BTS1 of the source cell to the base station BTS2 of the target cell, if the pre-set handover criterion and any other handover criteria set by an operator are met (step 36). The handover criterion of the invention is met, for example, if 6 dB is above set as the handover criterion, and the measurement results of the MS show that the signal level of BTS2 of the target cell is 6 dB stronger than the signal of BTS1 of the source cell. When handover is performed, the channel coding of the radio connection is set to be as determined in step 31.

In a preferred embodiment of the invention the handover criterion can be defined as described above with reference to the first embodiment and also by defining the handover criterion on the basis of channel coding, when the channel coding is implemented at the same protection level in the source cell and the target cell. When said channel coding is weaker than normal, the handover criterion value is decreased from normal. When the common channel coding is more efficient than normal, the channel coding value is increased from the normal. It is monitored that the handover criterion is met and handover is performed as described above.

Certain discrete values can be stored for the handover criterion of the invention, when there is a particular predetermined set of channel coding combinations of the target cell and the source cell. In this case it is possible to predetermine a corresponding criterion value for each combination, whereby in steps 33 and of FIG. 3, a value corresponding to the channel coding combination that is being monitored is set for the handover criterion. If, for example, A (weak), B (normal) and C (powerful) are possible channel codings at the base station of the source cell and the target cell area, a predetermined criteria value group could, for example, be as follows, when the handover criterion illustrates the relation of the signal level of base station BTS2 of the target cell to the signal level (dB) of base station BTS1 of the source cell:

|  | target cell | | |
| --- | --- | --- | --- |
| source cell | A | B | C |
| A | 3 | 0 | −3 |
| B | 6 | 3 | 0 |
| C | 9 | 6 | 3 |

In the following, the invention will be described more closely with reference to the example of FIG. 2. In FIG. 2 the radio connection of the mobile station MS is implemented with weak channel coding in the area of BTS1. As BTS2 can, in addition to normal channel coding, also offer powerful channel coding to a connection, the handover criterion is decreased from the normal according to the first embodiment of the invention; this triggers the handover, which is performed as early as at point x2, provided that the other handover criteria optionally set by an operator are met. In this example, the radio connection between BTS2 and the MS is continued after the handover with powerful channel coding.

Instead of the relation of the signal levels of the target cell and the source cell used in the first embodiment, other embodiments of the invention may use other suitable handover criterion of the prior art, for example, absolute signal levels of the source cell and the target cell as the handover criterion. The measurement of the signals is implemented in a manner applicable to each system.

Figure 4A:
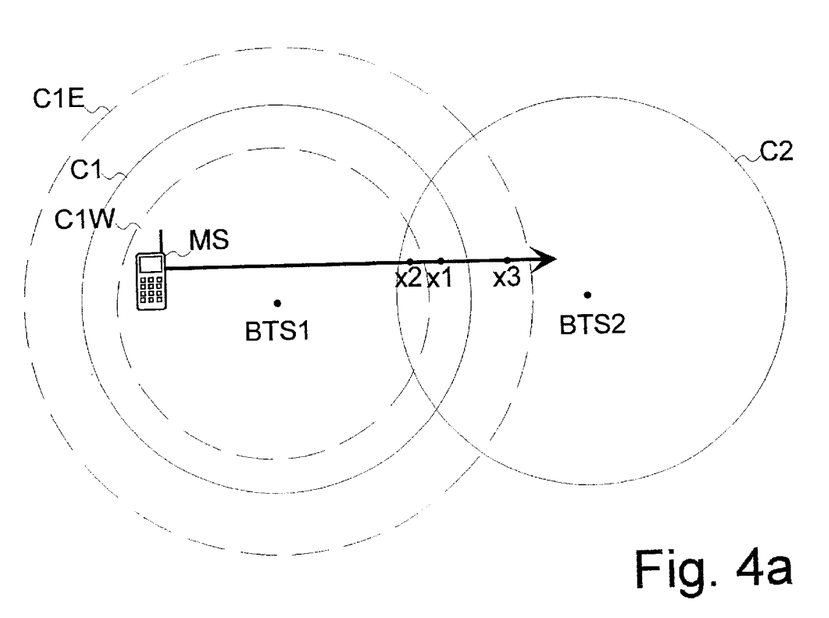
FIGS. 4a and 4b are examples of the first embodiment of the handover of the invention.
Figure 4B:
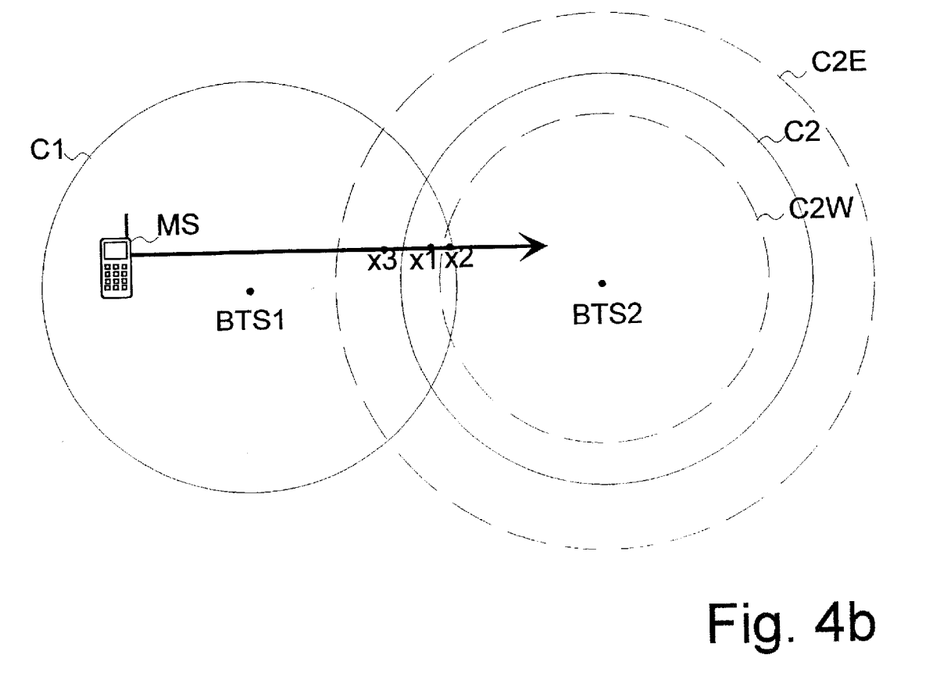

FIG. 4*a* shows two examples of when handover is performed according to the invention, handover being performed from BTS1 to BTS2, which offers only normal channel coding (cell coverage C2). In the first example the radio connection is implemented at base station BTS1 with weak channel coding (cell coverage C1W). According to the first embodiment of the invention the handover criterion is decreased as the channel coding of the target cell base station BTS2 is more powerful than the channel coding of the source cell base station BTS1. Handover is performed and channel coding is set, for example, at point x2 indicated in FIG. 4*a* when all handover criteria are met. In the second example the radio connection is implemented at base station BTS1 with powerful channel coding (cell coverage C1E), whereby the handover criterion is increased in accordance with the first embodiment of the invention. Handover is performed and channel coding is set, for example, at point x3. In the exemplary case the handover of the prior art would have been performed at point x1 indicated by way of comparison in the FIG. FIG. 4*b* shows correspondingly the point where the handover according to the invention is performed, when the handover of the radio connection implemented with normal channel coding is performed from BTS1 to BTS2, which can offer normal (cell coverage C2), weak (cell coverage C2W) and powerful channel coding (cell coverage C2E). According to the first embodiment of the invention, the handover criterion is decreased when the intention is to transfer the radio connection to the powerful channel coding at BTS2 of the target cell. Handover is performed and channel coding is set, for example, at point x3 indicated in FIG. 4*b*. If the intention is to perform handover for the weak channel coding to BTS2 of the target cell, the handover criterion is increased in accordance with the invention. Then handover is performed and channel coding is set, for example, at point x2 indicated in FIG. 4*b*. In the exemplary case, handover according to the prior art would again have been performed at point x1 indicated by way of comparison in the FIG.

In the second embodiment of the handover of the invention a handover priority is determined with a handover criterion of the invention and the target cell is determined using a method of the prior art with a criterion value which is to be set for the radio signal, for example, as the relation of the base station signal level of the target cell to the base station signal level of the source cell or on the basis of the quality measured at the source cell of the radio connection and the signal level of the target cell. A priority value is set for the radio connection according to the present invention, on the basis of which priority value the order in which different mobile station handovers are performed is determined. The priority value to be set is determined with a radio connection on the basis of error correction, preferably channel coding, used in the source cell.

Figure 5:
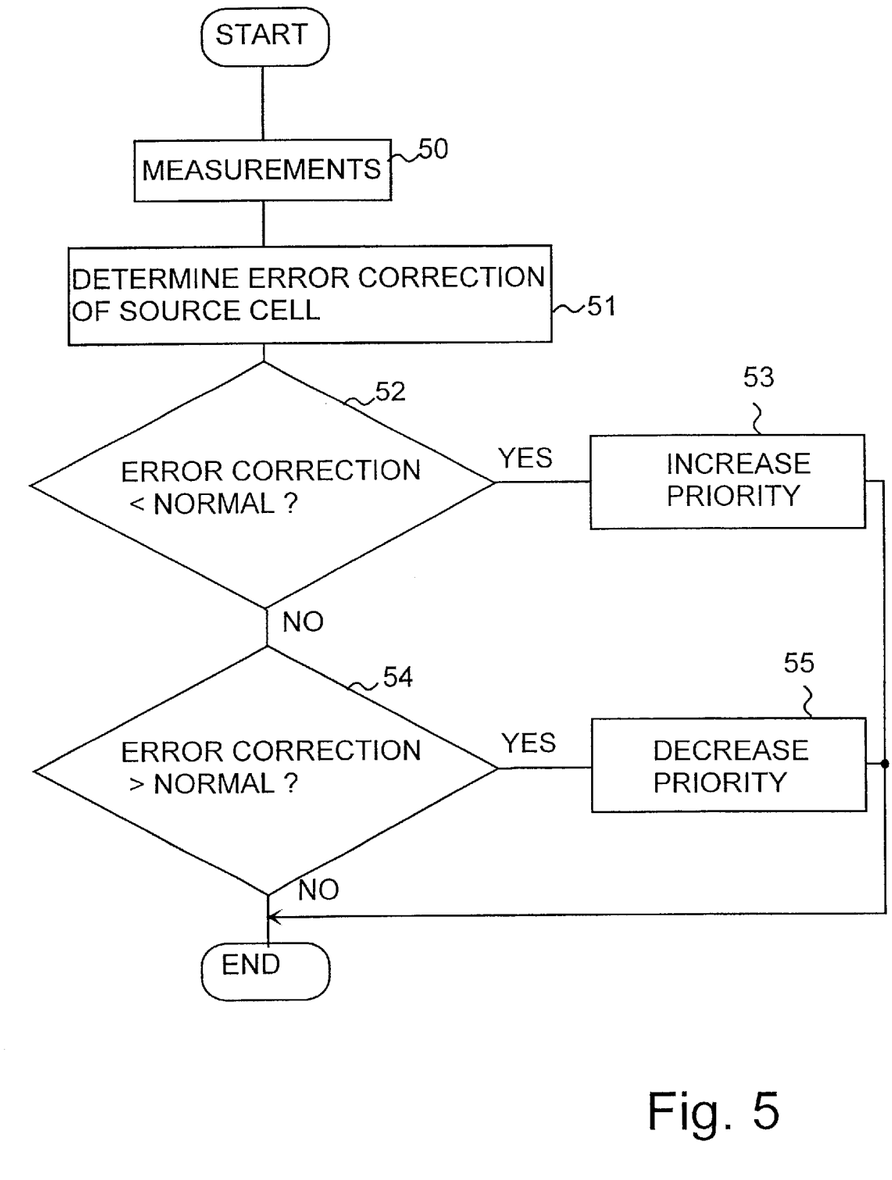
FIG. 5 is a flow chart of the second embodiment of the handover method of the invention.

In the following, the second embodiment of the handover of the invention is described using a flow chart shown in FIG. 5. At step 50 of FIG. 5 the signal level and/or quality of the radio connection is measured according to the prior art in the mobile station MS and the serving base station, in the case of FIG. 2 at BTS1. In addition, the mobile station MS measures neighbouring base station signals. At step 51 the protection level of error correction of the source cell is determined on a radio connection. Error correction is compared with normal error correction, for example, in a unit making the handover decision, preferably in a base station controller BSC or a mobile switching centre MSC (steps 52 and 54). When the protection level of error correction used by the radio connection is weaker than normal error correction, a priority (step 53), which is higher than normal, is set for the handover of the radio connection. When the error correction of the radio connection is more powerful than normal, a priority (step 55), which is lower than normal, is set for the handover of the radio connection. Handover from the source cell to the target cell is performed in the priority order triggered by the handover criterion, when the other handover criteria set by an operator have triggered handover.

According to a third embodiment of the invention, a handover is performed as stated above with reference to the first embodiment, except that, in addition to the channel codings offered to the radio connection by the base station of the target cell, the channel coding desired for the MS connection is also determined in step 31 of FIG. 3. In connection with call set-up, for example, an MS or some other network element may indicate the wishes it has concerning the error correction or transmission rate of the connection. If the base station of the target cell can offer the desired/allowed channel coding and also other channel codings for the connection, the desired/allowed channel coding is selected as the channel coding of the target cell for the connection. This channel coding will be used from step 32 of FIG. 3 onwards as the channel coding determining the handover criterion of the method of the invention and as the channel coding to be set for the connection in step 37.

The present handover method is applicable to error correction changing during handover. Although the invention has above been described particularly with reference to the first embodiment of the invention and for reasons of simplicity mainly in the case of one/a possible channel coding alternative of a target cell, the handover method of the invention can also be applied to the case of several channel coding alternatives. Then the handover criteria of the invention are separately determined for each channel coding and handover is performed for the channel coding of the determined criterion in question when the handover criteria are met.

The drawings and the description relating to them are intended merely to illustrate the inventive concept. In its details, the handover of the invention may vary within the scope of the claims. Although the invention has been described above mainly with reference to channel coding, the invention can also be used for other kinds of error correction. Different protection levels for error correction can also be arranged by changing the manner of error correction. The functionality of the invention is also applicable to the utilization of the protection level formed by the different protection manners in the handover method of the present invention. According to the invention, the use of error correction when determining the need and the selection of the target cell can be combined with any handover criteria of the prior art. In addition to mobile communication systems of the TDMA type, the invention is also applicable to other cellular mobile communication systems, e.g. systems implemented by the CDMA technology, particularly in the case of hard handover.

What is claimed is:

1. A handover method in a mobile communication system in which error correction of a radio signal can be arranged with different protection levels, said method comprising:

determining at least one first handover criterion depending on the error correction of a radio connection for the connection;

measuring the signal level and/or quality of base stations in a mobile station;

measuring the signal quality and/or level of the mobile station at a base station;

comparing at least one of the measurement results thus obtained and other variables of the connection with handover criteria including the determined first handover criterion; and performing a handover from a source cell to a target cell, when the handover criteria are met.

2. The method of claim 1, further comprising:

determining at least one error correction possible for the connection in a potential target cell of the handover;

setting said first handover criterion on the basis of the error correction of a source cell base station and the error correction of a determined potential target cell base station; and setting the error correction of a transferred connection as said error correction of the target cell base station in the target cell.

3. The method of claim 2, in order to set the first handover criterion, the method further comprising:

comparing the error correction of the source cell base station and the target cell base station with one another;

setting said first handover criterion in such a way that, in order to be met, it requires a signal that is better than normal from the target cell base station, when the error correction possible for the connection in the target cell is weaker than the error correction of the connection in the source cell; and setting said first handover criterion in such a way that, in order to be met, it requires a signal that is weaker than normal from the target cell base station, when the error correction possible for the connection in the target cell is more efficient than the error correction of the connection in the source cell.

4. The method of claim 3, further comprising:

determining the normal handover criterion as the difference of the level or quality of the target cell base station signal and the source cell base station signal;

increasing the handover criterion from the normal for setting said handover criterion in such a way that, in order to be met, it requires a signal better than normal from the target cell base station; and decreasing the handover criterion from the normal for setting said handover criterion in such a way that, in order to be met, it requires signal weaker than normal from the target cell base station.

5. The method as claimed in claim 3, when the error correction possible for the connection in the target cell is the same as the error correction of the connection in the source cell, the method further comprising:

setting said handover criterion in such a way that, in order to be met, it requires a signal weaker than normal from the target cell base station when said common error correction is weaker than normal; and setting said handover criterion in such a way that, in order to be met, it requires a signal better than normal from the target cell base station when said common error correction is more efficient than normal.

6. The method of claim 5, further comprising:

determining the normal handover criterion as the difference of the level or quality of the target cell base station signal and the source cell base station signal;

increasing the handover criterion from the normal for setting said handover criterion in such a way that, in order to be met, it requires a signal better than normal from the target cell base station; and decreasing the handover criterion from the normal for setting said handover criterion in such a way that, in order to be met, it requires signal weaker than normal from the target cell base station.

7. The method of claim 2, when the error correction possible for the connection in the target cell is the same as the error correction of the connection in the source cell, the method further comprising:

setting said first handover criterion in such a way that, in order to be met, it requires a signal weaker than normal from the target cell base station when said common error correction is weaker than normal; and setting said first handover criterion in such a way that, in order to be met, it requires a signal better than normal from the target cell base station when said common error correction is more efficient than normal.

8. The method of claim 7, further comprising:

determining the normal handover criterion as the difference of the level or quality of the target cell base station signal and the source cell base station signal;

increasing the handover criterion from the normal for setting said handover criterion in such a way that, in order to be met, it requires a signal better than normal from the target cell base station; and decreasing the handover criterion from the normal for setting said handover criterion in such a way that, in order to be met, it requires signal weaker than normal from the target cell base station.

9. The method of claim 1, wherein said determination of said first handover criterion is performed for implementing a handover priority depending on the error correction of the connection.

10. The method of claim 9, the method further comprising:

comparing the error correction of a radio connection in a source cell with normal error correction;

determining the handover priority of the connection in such a way that it is higher than normal, when the radio connection uses error correction which is weaker than normal in the source cell;

determining the handover priority of the connection in such a way that it is lower than normal, when the radio connection uses error correction which is more efficient than normal in the source cell; and performing the handover of the connection from the source cell to the target cell in a priority order triggered by said handover criterion, when the other handover criteria of the connection are met.

11. A mobile communication system where error correction of a radio signal can be arranged with different protection levels, said system being arranged to determine at least one first handover criterion depending on the error correction of the radio connection, measure the signal level and/or quality of base stations received in a mobile station, measure the signal quality and/or level of the mobile station received at a base station, compare at least one of the measurement results thus obtained and other variables of the connection with handover criteria including the first handover criterion, and perform a handover from a source cell to a target cell, when the handover criteria are met.

12. The mobile communication system of claim 11, the system being arranged to, in order to determine said first handover criterion, determine at least one error correction possible for the connection in a potential target cell of the handover, set said first handover criterion on the basis of the error correction of a source cell base station and a determined potential target cell base station, and set the error correction of the connection in the target cell as said error correction of the target cell base station.

13. The mobile communication system of claim 11, the system being arranged to determine said first handover criterion for implementing a handover priority depending on the error correction of the connection.

14. The mobile communication system of claim 11, 12, or 13, wherein the error correction used is channel coding.

* * * * *